Patented Feb. 13, 1934

1,946,709

UNITED STATES PATENT OFFICE 1,946,709

PROCESS FOR MAKING LEAD CARBONATE

Melville Fletcher Perkins, Tacoma, Wash., assignor to American Smelting and Refining Company, New York, N. Y., a corporation of New Jersey No Drawing. Application May 31, 1929
Serial No. 367,635

7 Claims. (Cl. 23—71)

This invention relates to the manufacture of lead compounds, and more particularly to an improved process of treating chlorine compounds of lead in the manufacture of lead carbonate. The invention provides for the substantial elimination of the chlorine and various other impurities and the production of lead carbonate on a commercial scale which is free from such impurities within the limits required in commercial uses.

The invention relates more specifically to the process of producing lead carbonate from lead hydroxychloride by the use of calcium hydroxide and carbon dioxide as reagents and provides a simplified process for the elimination of the chlorine and the calcium hydroxide in which the necessity for accurate chemical analysis of the quantities of these elements present and the necessity for the addition of the reagents in the precise chemical equivalent quantities is avoided.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particularly commercial embodiment thereof is disclosed. It will be understood however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

In accordance with the present invention lead bearing ores are treated with suitable reagents for the formation of chlorine compounds of lead such as lead hydroxychloride. The particular means for forming this compound is well known in the art and forms no part of the present invention. The lead hydroxychloride is suspended in water and a quantity of reagent, such as calcium hydroxide which is capable of reacting with the chlorine to form a soluble compound of chlorine, is added to the solution in an amount slightly under the theoretical chemical equivalent of the chlorine to be removed.

A small amount of reagent which is capable of accelerating the reaction is then added to the solution which is carbonated, filtered and washed. The lead is now present in the form of lead carbonate, a substantial portion of the chlorine has been converted to soluble calcium chloride and removed and the carbonate is practically free from calcium since there is sufficient chlorine present to react with the entire quantity of calcium which was added in the previous steps.

The filter cake comprising lead carbonate and a small amount of chlorine is then treated for the elimination of the remainder of the chlorine by being repulped in water containing a small amount of alkali metal carbonate, hydroxide or peroxide which reacts with the chlorine to form a water soluble compound and may be carbonated and filtered to effect a substantially pure lead carbonate.

As a specific example of a method of carrying out the present process, the lead ores were suitably treated for the formation of lead hydroxychloride which may be suspended in water. The hydroxychloride was then treated with calcium hydroxide in a quantity of 85% to 90% of the theoretical amount of calcium required to combine with the chlorine of the lead hydroxychloride. If high grade chemical calcium hydroxide is employed and vigorous and efficient mixing means are utilized it may be possible to add calcium hydroxide in amounts as high as 98% of the theoretical requirements.

After the hydroxide has been added the mixture is vigorously agitated and may be passed through a colloid mill if desired to form a complete and intimate mixture of the materials.

To the mixture is now added a small amount of accelerator such as an oxidizing agent which is capable of speeding up the reaction and enables the final product to be obtained substantially free from both chlorine and calcium hydroxide as will be pointed out. Various oxidizing agents may be utilized as the accelerator for the present process such as sodium peroxide, $PbO_2$, $Pb_3O_4$, potassium permanganate, persulphates, chlorates, alkali metal hypochlorites, chlorine gas, ozone, etc., although an oxidizing agent which does not introduce foreign elements such as manganese or chlorine is preferable. $Pb_3O_4$ or red lead has been found particularly suitable and does not introduce any elements which would contaminate the final product.

After a small quantity of one of the above mentioned oxidizing agents has been added to the pulp the mixture may be carbonated by intermixing with carbon dioxide gas in order to form lead carbonate. The original chlorine of the lead hydroxychloride will then combine with the calcium to form soluble calcium chloride which may be removed from the lead carbonate by filtering and washing.

The lead carbonate may contain a small amount of chlorine, for example, .7%, but is practically free from calcium which when expressed as calcium oxide should be less than .1% to .3% CaO.

The filter cake is then repulped in water containing a small amount of alkali metal carbonate or hydroxide or alkali peroxide which reacts with the chlorine to form a water soluble chlorine compound. As a specific example, sodium hydroxide may be employed with a resulting formation of soluble sodium chloride. The material may then be carbonated and filtered and washed to remove the soluble compounds and leave lead carbonate which is substantially free from both calcium and chlorine. The carbonate produced as above has been found to contain less than .5% CaO+Cl.

If red lead is desired the carbonate may be heated in any well known manner to drive off the $CO_2$ and form $Pb_3O_4$. The presence of the oxidizing agent such as red lead assists in this step.

The above mentioned process eliminates the necessity for adding the calcium hydroxide in the precise quantity necessary to remove the chlorine from the lead, a feature which has presented serious difficulty in the operation of previous processes. The oxidizing agent such as red lead is the final product of the process and the greater part of the same is recovered with but little reprocessing. Its presence does not introduce additional steps or calculation.

It is to be noted that the presence of red lead or some other oxidizing agent during the repulping of the semi-pure lead carbonate filter cake with soda or caustic is essential since without such a substance the dissolution of the chlorine is very slow and incomplete. The presence of a small amount of red lead thoroughly incorporated in the lead carbonate precipitate also aids in the subsequent conversion of the lead carbonate into red lead when it is desired to obtain this product. The final product is sufficiently free from calcium hydroxide and chlorine to be utilized on a commercial basis without further processing or refining. In fact the improved process has been found to consistently yield lead carbonate containing less than 0.5% calcium hydroxide, a result which has heretofore been extremely difficult to obtain. The process is less sensitive to variations in operating conditions, quality of reagents and errors in analytical control than previous processes, and is accordingly much cheaper to carry out on a commercial basis.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of producing lead carbonate from chlorine compounds of lead which comprises forming a suspension of said chlorine compound of lead and adding thereto calcium hydroxide in a quantity such that the calcium is slightly less than the theoretical equivalent of the chlorine to be removed, carbonating the mixture in the presence of a suitable oxidizing agent whereby lead carbonate is produced, and treating the carbonate with a small amount of alkali metal compound capable of reacting with the remainder of the chlorine to produce a water soluble chloride.

2. The process of producing lead carbonate from chlorine compounds of lead which comprises forming a suspension of said chlorine compound of lead and adding thereto calcium hydroxide in a quantity such that the calcium is slightly less than the theoretical equivalent of the chlorine to be removed, carbonating the mixture in the presence of a suitable oxidizing agent whereby lead carbonate is produced, and treating the carbonate with a small amount of alkali metal compound of the group consisting of alkali metal carbonate, hydroxide and peroxide whereby a water soluble chlorine compound is obtained.

3. The process of producing lead carbonate from chlorine compounds of lead which comprises forming a suspension of said chlorine compound of lead and adding thereto calcium hydroxide in a quantity such that the calcium is slightly less than the theoretical equivalent of the chlorine to be removed, carbonating the mixture in the presence of a suitable oxidizing agent whereby lead carbonate is produced, treating said carbonate with a small amount of sodium hydroxide whereby the remainder of the chlorine is converted into sodium chloride, and separating the sodium chloride by forming a water solution thereof.

4. The process of producing lead carbonate from chlorine compounds of lead which comprises forming a suspension of said chlorine compound of lead and adding thereto calcium hydroxide in a quantity of from 80% to 95% of the theoretical equivalent of the chlorine to be removed, carbonating the mixture in the presence of a suitable oxidizing agent whereby lead carbonate is produced, and treating the carbonate with a small amount of alkali metal compound capable of reacting with the remainder of the chlorine to produce a water soluble chloride.

5. The process of producing lead carbonate from chlorine compounds of lead which comprises forming a suspension of said chlorine compound of lead and adding thereto calcium hydroxide in a quantity such that the calcium is slightly less than the theoretical equivalent of the chlorine to be removed, carbonating the mixture in the presence of red lead whereby lead carbonate is produced, treating said carbonate with a small amount of sodium hydroxide whereby the remainder of the chlorine is converted into sodium chloride, and separating the sodium chloride by forming a water solution thereof.

6. In the production of lead carbonate, the method which consists in reacting lead hydroxychloride with calcium hydroxide in such quantity that the calcium content thereof is slightly less than the amount theoretically necessary for complete reaction, carbonating same in the presence of a suitable oxidizing agent thereby forming lead carbonate, and removing chlorine by repulping the lead carbonate with an alkali metal carbonate.

7. In the production of lead carbonate, the method which consists in reacting lead hydroxychloride with calcium hydroxide in such quantity that the calcium content thereof is slightly less than the amount theoretically necessary for complete reaction, carbonating same in the presence of a suitable oxidizing agent thereby forming lead carbonate and removing chlorine by repulping the lead carbonate with akali metal hydroxide.

MELVILLE FLETCHER PERKINS.